United States Patent [19]
Parsons et al.

[11] 3,844,623
[45] Oct. 29, 1974

[54] ANTI-SKID CONTROL MEANS FOR AIR PRESSURE BRAKING SYSTEMS

[76] Inventors: David Parsons; Mervyn Packer, both of Tachbrook Rd., Leamington Spa, England

[22] Filed: Feb. 20, 1973

[21] Appl. No.: 333,646

[30] Foreign Application Priority Data
Feb. 21, 1972  Great Britain...................... 7920/72

[52] U.S. Cl. .............. 303/21 F, 188/181 A, 303/68
[51] Int. Cl. .............................................. B60t 8/06
[58] Field of Search .......... 303/21 F, 21 AF, 61–63, 303/68–69, 40, 7, 29; 188/181

[56] References Cited
UNITED STATES PATENTS

| | | | |
|---|---|---|---|
| 3,467,441 | 9/1969 | Clark et al.......................... | 303/21 F |
| 3,552,802 | 1/1971 | Packer et al. ...................... | 303/21 F |
| 3,731,980 | 5/1973 | Fink et al. .......................... | 303/21 F |
| 3,743,362 | 7/1973 | Neisch............................... | 303/21 F |
| 3,752,537 | 8/1973 | Ochiai................................ | 303/21 F |

*Primary Examiner*—Trygve M. Blix
*Assistant Examiner*—D. C. Butler

[57] ABSTRACT

The invention relates to fluid pressure braking systems for vehicles in which air pressure is used to produce the brake-applying force in brake operating member, and the brake-applying force is reduced in response to the operation of a skid-sensing means to relieve the braking so long as the tendency to skid exists. The invention provides a valve mechanism for insertion in such a system which controls the connection of the brake operating member to the pressure source through a driver's control valve and to exhaust, the valve mechanism including a first valve which connects the brake operating member selectively to the pressure source or to exhaust, a second valve, on the side of the first valve to which the pressure source is connected, which provides a degree of restriction of air flow to the brake operating member decreasing with increase of pressure on the downstream side of the first valve, and a pilot valve operated by the skid sensing member to control the first valve.

8 Claims, 8 Drawing Figures

ANTI-SKID CONTROL MEANS FOR AIR PRESSURE BRAKING SYSTEMS

This invention relates to valve mechanism for use as anti-skid control means in fluid pressure braking systems. In air pressure braking systems, it is known to provide for the release of the brakes when a tendency to skid occurs by providing a valve, controlled by a skid-sensing device, which disconnects motor cylinders operating the brakes from a pressure source and connects them to atmosphere so that the braking pressure falls, and various proposals have been made for controlling the restoration of pressure to the said motor cylinders, and consequent reapplication of the brakes, when the tendency to skid ceases. It is the object of the present invention to provide a valve mechanism for use in such fluid pressure braking systems which controls the release of the pressure from and the restoration of pressure to the brake operating motor cylinders in a manner such as to ensure satisfactory control of the brakes throughout the time when a tendency to skid exists.

According to the present invention there is provided a valve mechanism for insertion in a fluid pressure braking system including a source of air under pressure, brake operating means in which said air pressure acts to apply the brakes, a driver's control valve controlling the connection of said brake operating means to said air pressure source, and a skid sensing device, said valve mechanism when inserted in such a system between the driver's control valve and the brake operating means being controllable by said skid sensing device and controlling the connection of said brake operating means to said driver's control valve and to exhaust, wherein said valve mechanism comprises a main passage adapted to provide a connection between the driver's control valve and the brake operating means, said main passage including upstream and downstream portions, a first valve interposed between said upstream and downstream passage portions and having first and second positions in which it respectively connects said upstream passage portion to said downstream passage portion and separates said passage portions one from the other whilst connecting the downstream passage portion to an exhaust passage, a second valve interposed in said upstream portion of said main passage, means responsive to pressure in the downstream portion of said main passage to operate said second valve to provide a degree of restriction of flow in said main passage decreasing with increase of the pressure in said downstream portion of said main passage, and a pilot valve operated by the skid sensing means to control the action of air pressure from the driver's control valve on operating means for said first valve so that said first valve is held by said air pressure in its first position during normal braking and is urged by said air pressure to its second position when a skid is sensed.

The said valve mechanism may include a fourth valve provided in the exhaust passage from the first valve to control the rate of escape of air from the downstream portion of the main flow passage.

The second valve may be controlled by the difference between the input pressure and the braking pressure and its operation may be damped.

The second valve may comprise a profiled member movable to provide a variable degree of restriction of an orifice, the position of said profiled member relative to said orifice being controlled by the resultant pressure on a diaphragm exposed on one side to the input pressure and on the other side to the braking pressure.

The side of the diaphragm exposed to input pressure may communicate with the inlet of the valve mechanism via a restrictor, so that movement of a diaphragm with a reduction of braking pressure relative to input pressure may be damped.

Alternatively, the second valve may comprise a spool valve movable between positions in which it respectively closes and opens the main flow passage, the said spool valve being acted on at one end by the input pressure and on the other end by the braking pressure and by a spring, and a bypass being provided around the said spool valve which provides a rate of flow varying with the braking pressure.

The fourth valve may be arranged to provide an initial rapid rate of escape of air from the downstream portion of the main flow passage, followed by a more gradual escape thereof.

The fourth valve may comprise an outlet chamber connected to the downstream portion of the main flow passage only when the first valve is in its second position, a control chamber constantly connected to the downstream portion of the main flow passage, a flexible diaphragm separating said chambers, and a valve closure member carried by said flexible diaphragm and cooperating with an outlet orifice in said outlet chamber.

The first valve may comprise a diaphragm assembly consisting of two flexible diaphragms connected at their centres by a rod and each dividing one of two cavities into two chambers, the rod extending through a bore connecting the chambers on the sides of the diaphragms facing each other and valve seats being provided one at each end of the bore which are selectively engaged to close the corresponding ends of the bore by displacement of the diaphragm assembly in one direction or the other, the said bore being connected to the downstream portion of the main flow passage, the chambers connected by the bore being respectively connected to the driver's control valve through the second valve and to exhaust, the chamber on the outer side of the diaphragm and the chamber on the inner side thereof, which is connected to the driver's control valve being connected by an opening in that diaphragm, and the chamber on the outer side of the other diaphragm being connected to the pilot valve.

In the following description, the pressure at the inlet of the valve mechanism, governed by the driver's control valve, will be referred to as the "input pressure" and the pressure at the outlet of the valve mechanism, which corresponds to that in the brake operating motor cylinders, will be referred to as the "braking pressure."

Some embodiments of valve mechanism according to the invention will now be described by way of example with reference to the accompanying drawings, in which.

Figure 1:
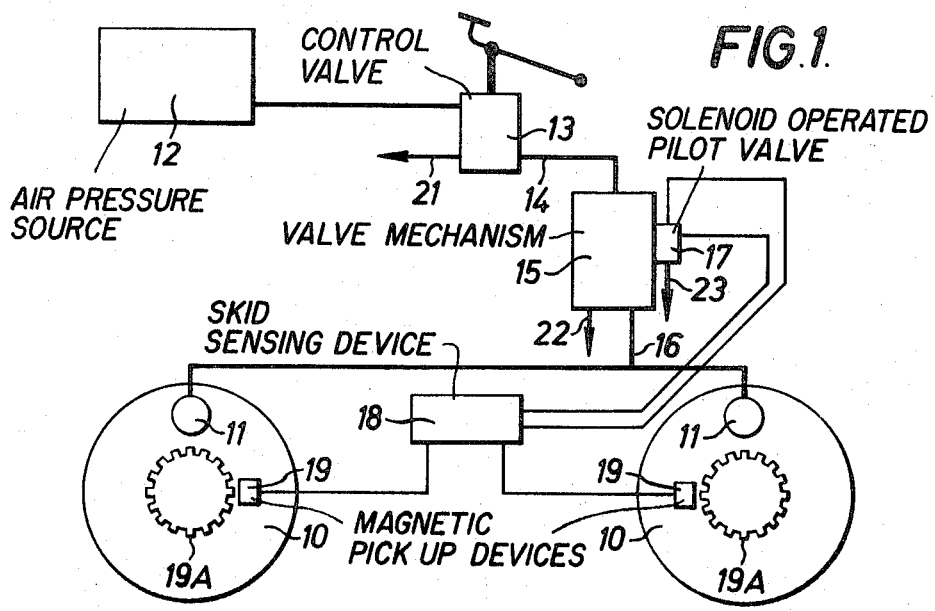
FIG. 1 is a diagram of an air pressure braking system embodying a valve mechanism according to the invention.

Referring to FIG. 1 of the drawings, wheels of a vehicle are represented at 10, on which wheels act brakes operated by air pressure motor cylinders 11. An air pressure source is provided at 12 and is connected to a conventional driver's control valve 13 from which a conduit 14 leads to a valve mechanism 15 forming the subject of the present invention. A further conduit 16 leading from the valve mechanism 15 is branched for connection to the motor cylinders 11. A solenoid-operated pilot valve 17 forming part of the valve mechanism 15 has the solenoid winding thereof connected in an electrical circuit with a skid-sensing device 18 which receives from magnetic pick up devices 19 electrical signals indicative of the speeds of the wheels 10, the electrical signals being generated in known manner by the cooperation of each magnetic pick up device 19 with a circular array of teeth 19a on the respective wheel 10. The skid-sensing device 18 is arranged so as to monitor the electrical signals it receives from the pick up devices 19 and to energize the solenoid winding when it senses that one of the associated wheels 10 tends to skid. Exhaust connections from the driver's control valve 13, the main part of the valve mechanism 15 and the pilot valve 17 are provided at 21, 22 and 23, respectively.

Referring now to FIGS. 2, 3, 4 and 5 of the drawings, a valve body 24 houses valves hereinbefore referred to as the first, second and fourth valves, these being, respectively identified by the reference numerals 25, 26 and 27, and a separate body 28, secured to the main body 24, houses the pilot valve, indicated by the reference 29.

The first valve 25 comprises a bore 31 connecting first and second cavities 32 and 33 both of larger diameter than the said bore, the said cavities being respectively divided into two chambers 32a, 32b and 33a, 33b by flexible diaphragms 34 and 35. The diaphragms 34 and 35 are connected one to the other at their centers by a rigid rod 36 and at the end of the bore 31 which open into the chambers 32b and 33a respectively there are provided valve seats 37 and 38 respectively, adapted to be engaged by the diaphragms 34 and 35, respectively, to isolate the bore from those chambers. The chamber 33b is connected by a passage 39 to the pilot valve 29 which controls connection of that passage to pressure or exhaust as will be hereinafter described.

A main flow passage through the body 24 of the valve mechanism includes an upstream portion 41, leading from an inlet at 42 adapted to be connected to the driver's control valve, to the cavity 32b of the first valve, and a downstream portion 43 leading from the bore 31 of the first valve to an outlet at 44 adapted to be connected to the brake operating motor cylinders. In the upstream portion 41 of the said main passage is mounted the second valve 26.

The diaphragm 34 is formed with an aperture 45 at a position radially outside the valve seat with which that diaphragm cooperates, the said aperture thus connecting the chambers 32a and 32b one to the other.

The second valve 26 is housed in a bore in the valve body 24 defining coaxial first and second cylindrical cavities 46 and 47 separated by a partition 48 in the centre of which is a relatively small opening 49. The cavity 47 is divided by a flexible diaphragm 51 into two chambers 47a and 47b, the chamber 47a, nearer to the partition 48 being connected, by the upstream portion 41 of the main flow passage, to the inlet 42. The chamber 47b is connected by a passage 52 to the bore 31 of the first valve 25. A rod 53, attached to the diaphragm 51 and extending through the opening 49 carries a profiled member 54 cooperating with the said opening 49 to provide a varying degree of restriction of flow through the opening as the rod 53 moves axially, and a spring 55 in the cavity 46, acting on a spring abutment 56 carried by the rod 53, urges the said rod in a direction to reduce the restriction of the opening 49.

The upstream portion 41 of the main flow passage also connects the chamber 46 to the chamber 32b of the first valve 25.

The solenoid operated pilot valve 29 comprises a valve head 57 movable to engage either one of two seats on opposite sides of a chamber 58 connected by a passage 59 to the chamber 33b of the first valve 25. A passage 60 opening into the chamber 58 through one of the two seats leads from the inlet 42, and a port 61 opening into the chamber 58 through the other of the said seats leads to the exhaust connection 23. The valve head 57 is spring urged on to the seat in the exhaust port 61, as that the chamber 33b is normally connected to the driver's control valve through the inlet 42, but the said valve head is moved on to the other seat when the skid sensing device operates to isolate the said chamber 33b from the driver's control valve and connect it to exhaust.

The valve 27 is housed in a cavity 62 in the valve body 24, the said cavity being divided into two chambers 62a and 62b by a diaphragm 63 and the chamber 62a being connected by a branch conduit 64 to the downstream portion 43 of the main flow passage. The exhaust connection 22, referred to in the description of FIG. 1, leads from the other end of the chamber 62b which thus constitutes an outlet chamber and is surrounded by a valve seat 65. The chamber 62b is also connected by a passage 66 to the chamber 33a of the first valve.

The diaphragm 63 carries a closure member 67 to cooperate with the valve seat 65 and close the exhaust connection 22, a spring 68 in the chamber 62b acting to urge the diaphragm in a direction to unseat the said closure member. The passage 64 opens into the chamber 62a, which serves as the control chamber of the valve 27, by way of a main orifice 69 with which is associated a non-return valve 71 preventing air from flowing out of the chamber 62a through the said main orifice 69, and also by way of a more restricted auxiliary orifice 72 which is constantly open. An apertured partition 70 in the chamber 62a provides an abutment for the spring 71a of the non-return valve 71.

Figure 2:
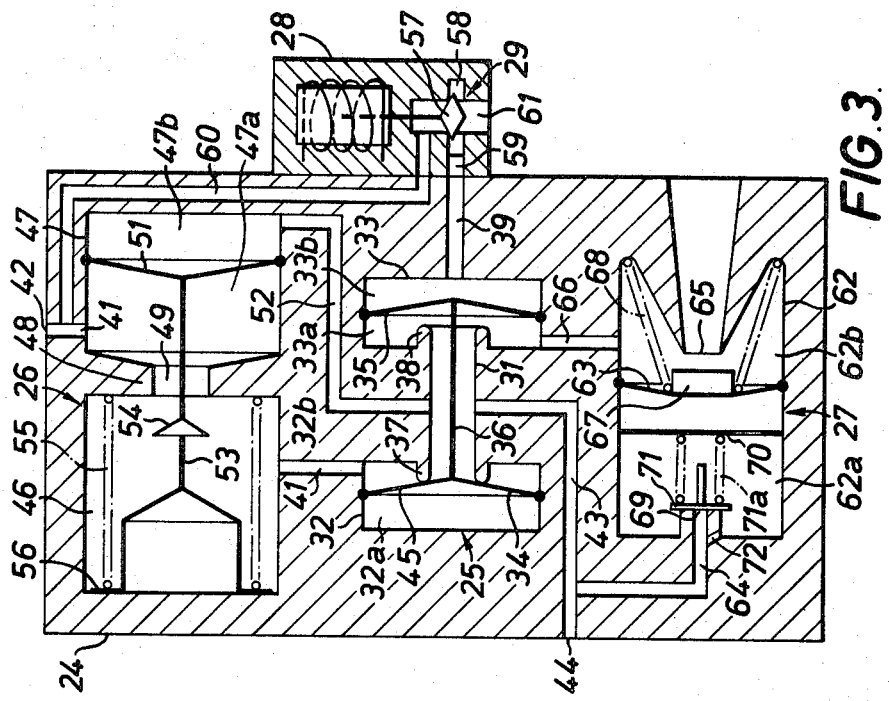
FIGS. 2, 3, 4 and 5 are diagrammatical sectional views of one form of valve mechanism according to the invention showing respectively the positions of the valve mechanism components during normal operation of the brakes, during initial release of the brakes when a skid is sensed, during a later stage of release, and during brake re-application.
Figure 3:
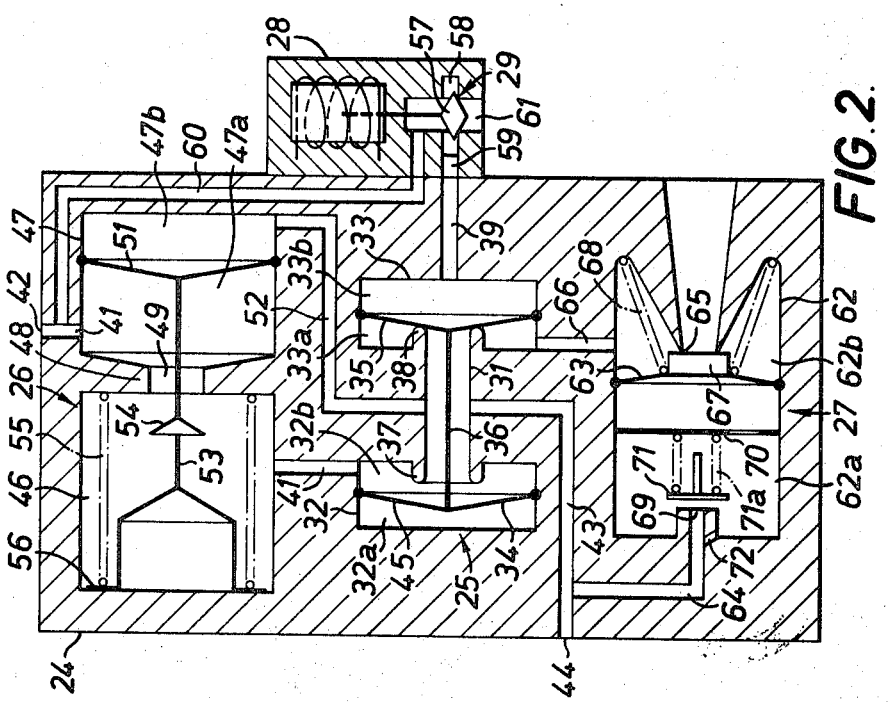
Figure 5:
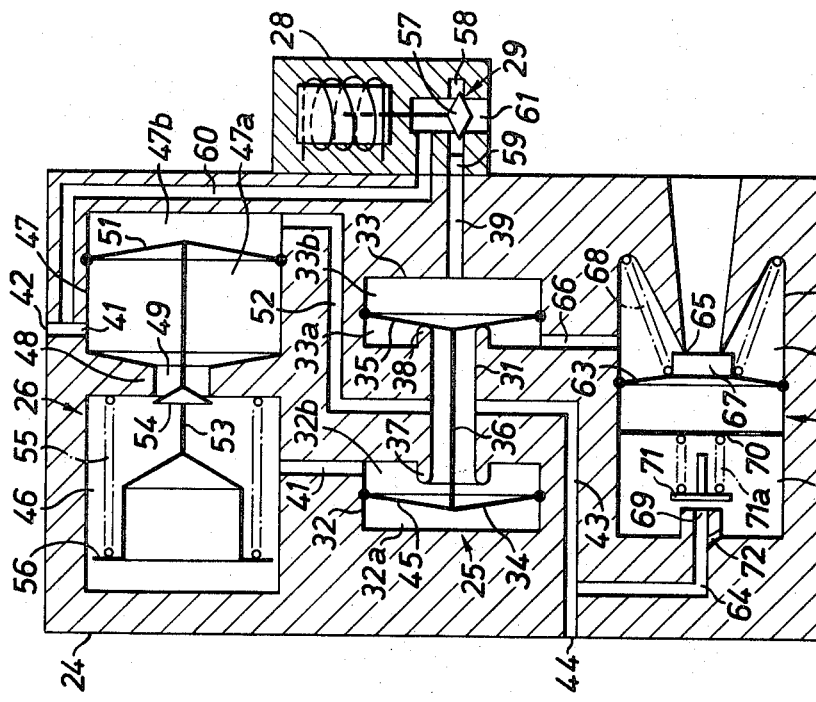

During the normal application of the brakes, the driver's control valve 13 is operated to admit air under pressure from the source 12 to the valve mechanism 15. The solenoid of the valve 29, under these conditions, is not energized, so that valve head 56 is in the position to close the exhaust port 61, and the source pressure acts, through the branch passage 59, valve 29 and passage 58 in the chamber 33b, thus urging the diaphragm 35 on to the seat 38 so that the passage 66 is closed to cut off the chamber 62b from the bore 31 of the first valve. The diaphragm 34 is held off the seat 37, and there is thus a clear connection between the inlet 42 and the outlet 44 leading to the brake operating motor cylinders, through the upstream portion 41 of the main flow passage, including the orifice 49 of the second valve 26, the chamber 32b and bore 31 of the first valve 25, and the downstream portion 43 of the main flow passage. The profiled member 54 is held in a position to provide maximum opening of the orifice 49 by the spring 55, air pressure acting on the diaphragm 51 in the chamber 47a being balanced by air pressure reaching the chamber 47b through the bore 31 of the first valve 25 and through the passage 52. The components of the valve mechanism are shown in FIG. 2 in the positions just described.

When a tendency to skid is sensed by the device 18 the solenoid of the pilot valve 29 is energized, and the valve head 57 moves from the seat in the exhaust port 61 to the seat in the passage 60, thus isolating the chamber 33b from the pressure source and connecting it to exhaust. The pressure acting in the chamber 33b on the diaphragm 35 therefore disappears and, since the source pressure is still acting on that part of that diaphragm lying inside the seat 38 whilst the pressures on the diaphragm 34 are balanced, the said diaphragm 35 is urged away from the seat 38, the whole diaphragm assembly moving until the diaphragm 34 engages the seat 37, being held in that position because the thrusts on opposite sides of the diaphragm 34 are now unbalanced due to a greater area of that diaphragm being exposed in the chamber 32a than is exposed in the chamber 32b. The source pressure is thus cut off from the brake operating motor cylinders by the engagement of the diaphragm 34 with the seat 37. The components of the valve mechanism are shown in this position in FIG. 3.

The pressure in the bore 31 of the first valve 25, which now corresponds to that in the brake operating motor cylinders, is transmitted through the cavity 33a and passage 66 to the chamber 62b of the valve 27. Since the chamber 62a is also connected to the bore 31 through the downstream portion 43 of the main flow passage and the branch passage 64, pressures across the diaphragm 63 are balanced, and the spring 68 moves the said diaphragm to unseat the closure member 67 and open the exhaust port surrounded by the seat 65.

Air can now escape from the brake operating motor cylinders through the downstream portion 43 of the main flow passage, the bore 31 and chamber 33a of the first valve 25, the passage 66 and the chamber 62b of the fourth valve, at a fairly rapid rate, thus releasing the brakes. During this period, the pressure in the chamber 62a of the fourth valve 27 also falls, but at a slower rate, since the non-return valve 71 closes the main orifice 69 leading from that chamber, and air can escape only through the restricted orifice 72. Because the air escapes more freely from the chamber 62b than from the chamber 62a a pressure differential tends to be established across the diaphragm 63 tending to re-seat the closure member 67, so that the escape of air from the chamber 62b tends to be restricted to a minimum value governed by the load of the spring 68. This pressure existing in the brake operating motor cylinders when this condition is reached thus bears a fixed relation, depending on the load of the spring 68, to the brakeline pressure existing when the skid was sensed and is not directly related to atmospheric pressure.

Once the above-mentioned condition is reached, air continues to escape from the chamber 62a of the valve 27, through the auxiliary orifice 72 and the chamber 62b, at a rate depending on the flow restriction provided by the said auxiliary orifice, until the pressure is wholly released, or until the tendency to skid ceases and the pilot valve head 57 reverts to its normal position to restore the valve mechanism to the condition shown in FIG. 2.

Figure 4:
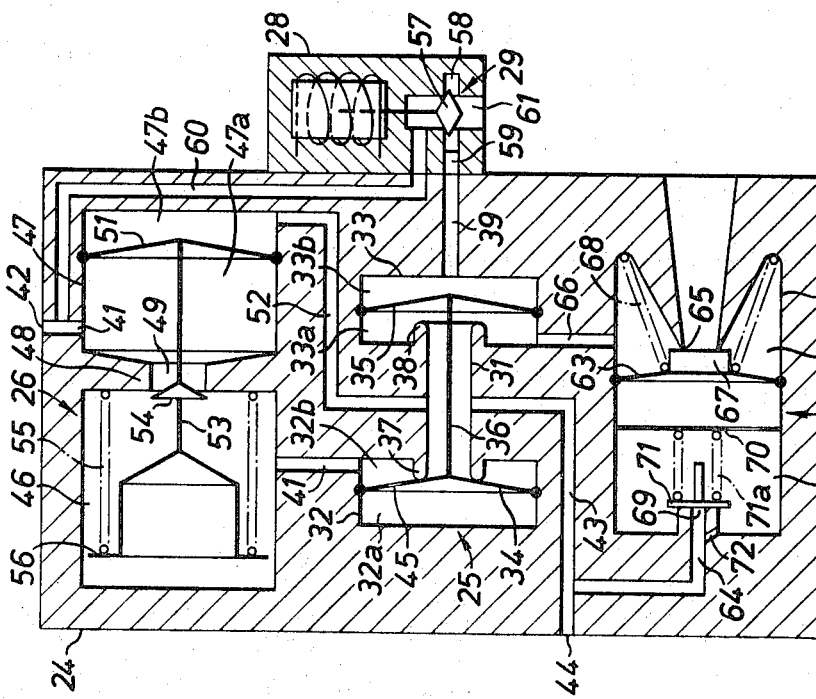

When, as a result of operation of the pilot valve 29 by the skid sensing device, the diaphragm assembly of the first valve 25 moves to seat the diaphragm 34 on the seat 37 and so shut off the brake operating motor cylinders from the pressure source it also connects the chamber 47b of the second valve 26, by way of the passage 52, bore 31, chamber 33a and passage 66 to the chamber 62b of the fourth valve. Consequently, whilst the pressure in the brake operating motor cylinders is falling in the manner described above, the pressure in the chamber 47b is also falling, and the source pressure acting in the chamber 47a moves the diaphragm 51 to cause the profiled member to create an increasing restriction of the orifice 49. The condition of the valve mechanism when this has occurred is shown in FIG. 4.

When the tendency to skid ceases, and the head 57 of the pilot valve 29 reverts to the position of FIG. 2, air pressure from the source acts in the chamber 33b of the first valve 25 to return the diaphragm assembly of that valve to its normal position, re-opening the connection through the said valve 25 between the portions 41 and 43 of the main flow passage, the flow of air to the brake operating motor cylinders is retarded due to the displacement, before the pilot valve reverted to that position, of the profiled member 54 of second valve. The said return of the diaphragm assembly of the first valve to its normal position also shuts off the flow of air to the chamber 62b of the fourth valve, by causing the diaphragm 35 to engage the seat 38, so that the braking pressure is restored, the rate of restoration depending on the degree of restriction of flow by the profiled member 54, and increasing progressively as the pressure in the chamber 47b, with the brake applying pressure, rises. The rate of increase of the brake applying pressure is thus controlled by the difference between that pressure and the input pressure to the valve mechanism, and the rate of re-application of the brakes can be made constant.

Whilst it has been found desirable in some cases to control the rate at which air is released from the brake operating motor cylinders to release the brakes when a skid is sensed, such control is unnecessary in many cases, thus enabling the fourth valve 27 of FIGS. 2 to 5 to be dispensed with and permitting the cavity 33a of the first valve to be connected directly to exhaust.

Figure 6:
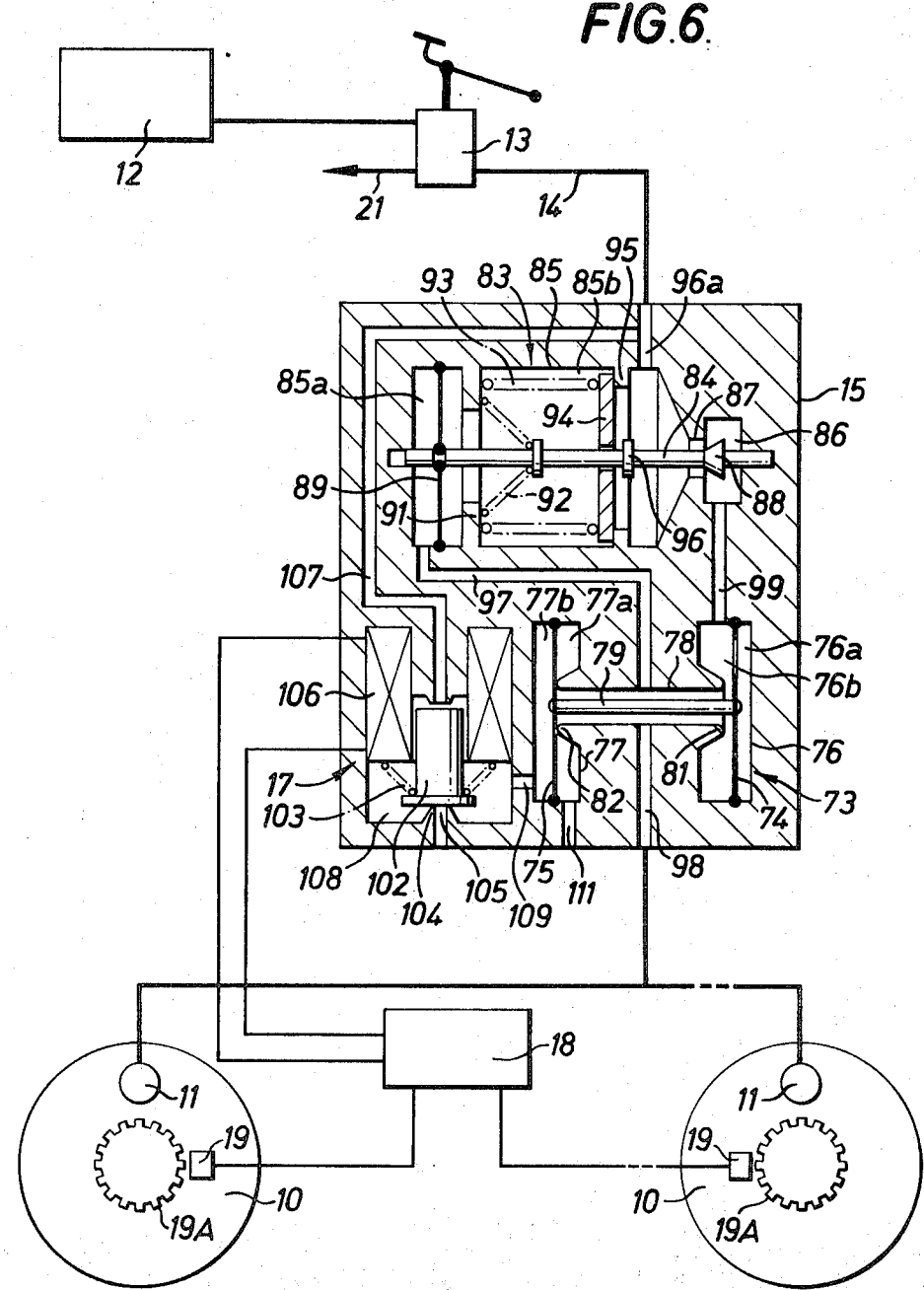
FIG. 6 is a diagrammatical view similar to FIG. 2 of another form of valve mechanism according to the invention.

A modified form of valve mechanism excluding the fourth valve is shown diagrammatically in FIG. 6 of the drawings, the other elements of a braking system in which the valve mechanism is incorporated being shown diagrammatically and indicated by the same reference numerals as in FIG. 1. Referring to FIG. 6, the mechanism includes a first valve 73, generally similar to the first valve 25 of FIGS. 2 to 5, including two diaphragms 74 and 75, respectively, dividing cavities 76 and 77 into chambers 76a and 76b and into chambers 77a and 77b. The chambers 76b and 77a are connected by a bore 78 through which extends a rod 79 connecting the diaphragms 74 and 75 one to the other, and at the ends of the bore 78, where it opens into the chambers 76b and 77a, respectively, are valve seats 81 and 82 engageable respectively by the diaphragms 74 and 75 to close the ends of the bore, one diaphragm always being off its seat when the other is seated.

A second valve 83 performing the same function as, but differing somewhat in arrangement from, the valve 26 shown in FIGS. 2 to 5, comprises a rod 84 extending slidably through two coaxial cavities 85 and 86 connected one to the other by an orifice 87 the effective area of which is variable by means of a profiled member 88 carried by the rod 84. An annular diaphragm 89, fixed at its inner periphery to the rod 84 divides the cavity 85 into two chambers 85a and 85b, of which the chamber 85b is connected by the orifice 87 to the cavity 86. A spring abutment shoulder 91 in the chamber 85b provides an abutment for two springs, namely a relatively light spring 92 acting directly on the rod 84 to urge it in a direction such that the profiled member provides decreasing restriction of the orifice 87, and a relatively stronger spring 93 acting on a disc 94 normally held by the said spring against a second abutment flange 95 in the chamber 85b a stop 96 on the rod 84 which, when the profiled member 88 is in a normal position providing minimum restriction of the orifice 87, is spaced from the disc 94, moves into contact with that disc after the profiled member has moved to provide some increase of restriction of the orifice 87, so that continued movement of the said member 88 to further increase the restriction is opposed by both springs.

The chamber 85b of the valve 83 is connected by a passage 96a to the inlet from the driver's control valve 13, and the chamber 85a of the valve 83 is connected by a passage 97 to the bore 78 of the valve 73. A passage 98 leads from the bore 78 to an outlet connected to the brake operating motor cylinders 11. A passage 99 connects the chamber 76b of the valve 73 to the cavity 86 of the valve 83.

The solenoid operated pilot valve 17, comprising a closure member 102 normally held by a spring 103 on a seat 104 closing an exhaust port 105 is moved by energization of a solenoid 106 when the sensing device 18 senses a skid to close a branch passage 107 leading from the passage 96 to the chamber in which said closure member 102 is mounted. That chamber, shown at 108, is also connected to the chamber 77b of the valve 73 by a passage 109, the chamber 77a of that valve being connected to exhaust at 111.

During normal operation of the brakes, the exhaust outlet 105 is closed, so air pressure from the source 12 passes through the passage 107, chamber 108 and passage 109 to the chamber 77b and acts on the diaphragm 75, closing the connection between the chamber 77a and the bore 78 and holding open the connection between the chamber 76b and the bore 78, so that air under pressure can flow from the driver's control valve by way of the passage 96, chamber 85b, cavity 86, passage 99, chamber 76b, bore 78 and passage 98 to the brake operating motor cylinders 11. When a skid is sensed, the pilot valve 17 is operated to shut off the chamber 77b from the pressure source and connect it to exhaust so that, as explained with reference to FIGS. 2 to 5, the diaphragm assembly of the valve 73 moves to open the connection between the bore 78 and the chamber 77a, and to close the connection between the said bore 78 and the chamber 76b. The brake operating motor cylinders are thus cut off from the pressure source, and are connected to exhaust through the chamber 77a, so that the brake operating pressure in the said motor cylinders falls. The pressure in the chamber 85a of the valve 83 also falls, so that the diaphragm 89, being exposed in the chamber 85b to the pressure from the source 12, is displaced to move the rod 84 and profiled member 88 so that the latter reduces the effective area of the orifice 87. Initially, such movement of the rod 84 is opposed only by the spring 92. The passage around the rod 84 and through the aperture in the disc 94 becomes restricted as the stop 96 approaches the disc 94 so that the transfer of air from the passage 96a through the aperture in the disc 94 to the chamber 85b is opposed and movement of the rod 84 in the same sense is damped. Until the stop 96 is brought into contact with the disc 94. Further movement of the rod 84 in the same sense displaces the disc 94 from the shoulder 95 so that the spring 93 also opposes the movement. Furthermore such movement is damped by the effect of the restricted passage around the outer periphery of the disc 94 once the disc 94 has separated from the shoulder 95.

Thus, when the pilot valve 17 again moves to restore braking, the orifice 87 is restricted, and the rate of restoration of braking is controlled, the initial rate of restoration being relatively slow until the spring 93 brings the disc 94 into engagement with the abutment shoulder 95, and quickly thereafter.

The movement of the closure member 102 of the pilot valve 17 in FIG. 6, or of the corresponding closure member 57 of the pilot valve in FIGS. 2 to 5, may control an electric switch (not shown) in a warning circuit providing an indication if the pilot valve fails to operate as intended when a skid is sensed.

It has been found that the rate of re-application of the brakes, on a very slippery road surface may need to be lower than on a less slippery road surface, to avoid recommencement of skidding as soon as the brakes are reapplied. The value to which the pressure in the brake operating motor cylinders falls before a skid is stopped is a measure of the degree of slipperiness of the surface, and the valve mechanism according to the invention, may be modified to control the restoration of braking at a rate which depends on the value to which that pressure falls.

Figure 7:
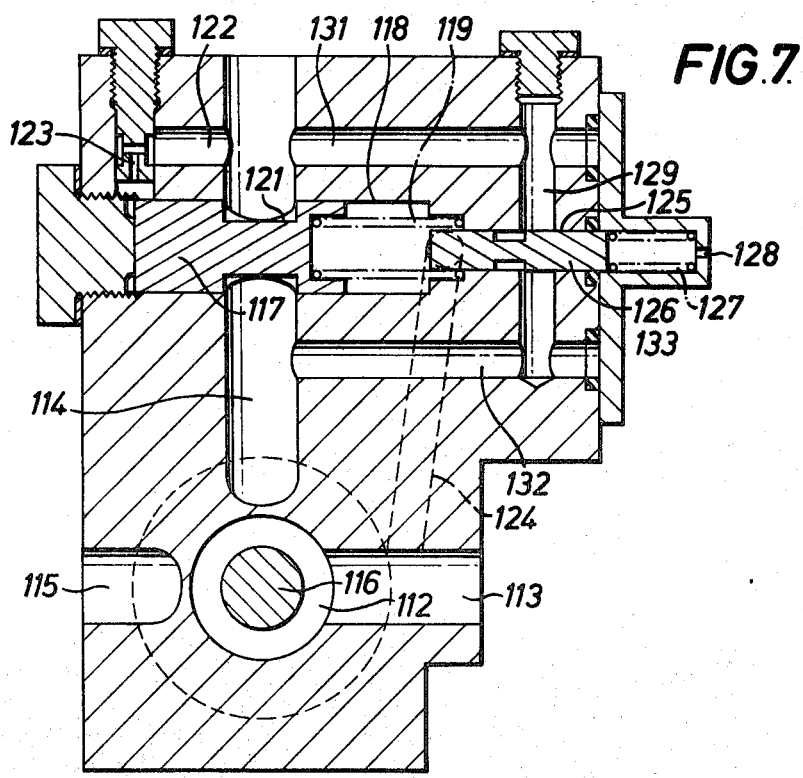
FIG. 7 is a sectional elevation of a further form of valve mechanism according to the invention.

This modification consists in the replacement of the valve 26 in FIGS. 2 to 5, or the valve 83 in FIG. 6, by a valve shown in FIG. 7. In that figure, the bore of a first valve corresponding to the valve 26 in FIGS. 2 to 5 or to the valve 73 in FIG. 6 is shown at 112 and is connected to the brake operating motor cylinders by a passage 113. A main inlet passage 114 leading from the driver's control valve, and a main exhaust passage 115, are respectively connected to cavities at opposite ends of the bore 112, the connection of the said cavities to the said bore being controlled, as previously described, by a diaphragm unit the rod of which is shown at 116.

A valve spool 117, slidable in a bore 118 intersecting the passage 114 is normally held, by a light spring 119, in the position shown in FIG. 7, in which a circumferential groove 121 around the said spool coincides with the passage 114. Air under pressure fed to the valve mechanism through the driver's control valve is fed through a passage 122 and flow restrictor 123 to the bore 118 so as to act on the end of the valve spool 117 opposite to that on which the spring 119 acts.

The other end of the bore 118 is connected, by a passage shown in dotted lines at 124, to the passage 113, so that whatever pressure exists in the brake operating motor cylinders also acts on the valve spool 117 in the same direction as does the spring 119.

The bore 118 has coaxial with it, and extending from the end into which the passage 124 opens, a further bore 125 of smaller diameter in which is slidable a second valve spool 126, one end of which is acted on by the pressure in the brake operating motor cylinders since it is exposed to the end of the bore 118 connected to the said motor cylinders and the other end of which is acted on by a spring 127, the end of the bore 125 in which is exposed the end of the valve spool 126 being vented to atmosphere at 128. A passage 129 intersecting the bore 125 is connected by further passages 131 and 132 to the passage 114 on opposite sides of its intersection with the bore 118, and the valve spool 126 has a circumferential groove 133 which, when it registers with the passage 129, completes a bypass around the spool valve 117.

The valve shown in FIG. 7 operates in the following manner. When the brakes are applied and no skid is sensed, the same pressure, namely that controlled by the driver's control valve, acts on both ends of the valve spool 117, so it is held by the spring 119 in the position shown, leaving the passage 114 unobstructed. When, upon a skid being sensed, the pilot valve changes over and the passage 113, leading to the brake operating motor cylinders, is cut off from the pressure source and connected to exhaust, the air pressure acting on the valve spool 117 in the same direction as the spring 119 drops and the said valve spool moves to close the passage 114. The drop of pressure in the bore 118 also allows the second valve spool 126 to move to a position in which, whilst it does not close the bypass passage 129 it provides substantial restriction of air flow therethrough.

When the pilot valve subsequently operates due to the tendency to skid ceasing, air under pressure can immediately reach the brake operating motor cylinders only through the bypass passage, the opening of which is increased by movement of the valve spool 126 as the pressure in the said motor cylinders increases, so that the rate of restoration of braking pressure depends on the pressure in the said motor cylinders. As that pressure builds up, the thrust acting on the valve spool 117 to re-open the passage 114 increases, but that valve spool does not move to open the said passage until the pressure in the motor cylinders is restored to nearly the same value as that determined by the driver's control valve.

In a further modification of the valve mechanism according to the invention the valve 26 shown in FIGS. 2 to 5, which controls the rate at which the brakes are reapplied is so arranged that the forces acting reduce the flow restriction provided by that value, and thus increase the rate at which the braking pressure is restored, include a component dependent directly on the pressure in the brake operating motor cylinders as well as a component dependent on the difference between that pressure and the pressure derived from the source through the driver's control valve.

Figure 8:
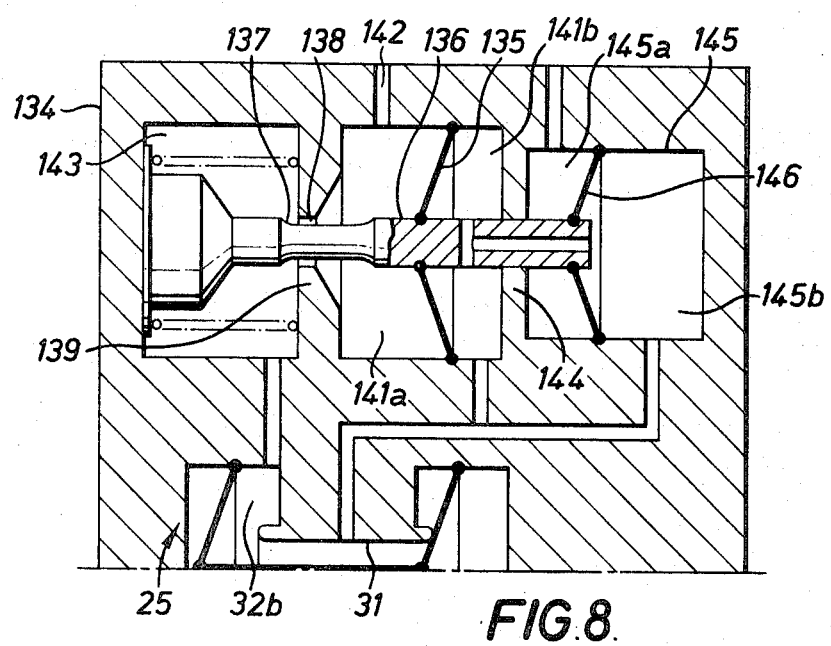
FIG. 8 is a sectional elevation showing a modified form of the valve which provides restriction of flow of air in the upstream portion of the main passage.

This further modification is shown in FIG. 8, which corresponds to the upper part of FIG. 2 showing the modified valve 134, a part of the valve 25, and the connections between the said valves. The valve 134 has a flexible diaphragm 135 corresponding to the diaphragm 51 of the valve 26 in FIG. 2, a rod 136 corresponding to the rod 49, and a profiled portion 137 on the rod 136 corresponding to the profiled member 54. The profiled portion 137 of the rod 136 varies the flow restriction provided by an orifice 138 in a partition 139 connecting a chamber 141a into which opens a passage 142 leading from the driver's control valve to a cavity 143 connected to the chamber 32b of the valve 25. A chamber 141b on the opposite side of the diaphragm 135 to the chamber 141a is connected to the bore 31 of the valve 25 and so to the brake operating motor cylinders. The rod 136 extends through a wall 144 separating the chamber 141b from a cavity 145 divided by a further flexible diaphragm 146 fixed at its centre to the rod 136 into a chamber 145a vented to atmosphere and a chamber 145b connected, like the chamber 141b to the bore 31 of the valve 25.

The braking pressure, acting on the diaphragm 146 in the chamber 145b, provides the force component acting on the second valve which is directly dependent on the said braking pressure.

Instead of being connected directly to the brake operating motor cylinders, the outlet of each embodiment of valve mechanism according to this invention which is described above with reference to the accompanying drawings may be connected to a pneumatic actuator which is connected to a liquid pressure master cylinder for applying a working thrust to a liquid pressure generating piston, the liquid pressure master cylinder being arranged to supply liquid under pressure to the brake operating motor cylinders in known manner to apply the brakes. The manner in which application of the brakes of such a fluid pressure braking system (which is known in the art as an "Air-over-Hydraulics" braking system) is controlled automatically by a valve device according to this invention will be apparent from the foregoing description to anyone familiar with such fluid pressure braking systems.

We claim:

1. A valve mechanism for insertion in a fluid pressure braking system including a source of air under pressure, brake operating means, a control valve controlling the connection of said brake operating means to said air pressure source, driver operated control means for said control valve, and a skid sensing device, said valve mechanism when inserted in such a system between said control valve and the brake operating means being controllable by said skid sensing device and controlling the connection of said brake operating means to said control valve and to exhaust, wherein the improvement comprises said valve mechanism comprising:

i. a main passage adapted to provide a connection between the control valve and the brake operating means, and including upstream and downstream portions;

ii. a first valve interposed between said upstream and downstream passage portions and having first and second positions in which it respectively connects said upstream passage position to said downstream passage portion and separates said passage portions one from the other whilst connecting the downstream passage portion to an exhaust passage;

iii. a second valve interposed in said upstream portion of said main passage;

iv. means responsive to pressure in the downstream portion of said main passage to operate said second valve to provide a degree of restriction of flow in said main passage decreasing with increase of the pressure in said downstream portion of said main passage; and v. a pilot valve operated by the skid sensing means to control the action of air pressure from the control valve on operating means for said first valve so that said first valve is held by said air pressure in its first position during normal braking and is urged by said air pressure to its second position when a skid is sensed.

2. A valve mechanism for insertion in a fluid pressure braking system including a source of air under pressure, brake operating means, a driver's control valve controlling the connection of said brake operating means to said air pressure source, and a skid sensing device, and valve mechanism when inserted in such a system between the driver's control valve and the brake operating means being controllable by said skid sensing device and controlling the connection of said brake operating means to said driver's control valve and to exhaust, wherein the improvement comprises said valve mechanism comprising:

i. a main passage adapted to provide a connection between the driver's control valve and the brake operating means, and including upstream and downstream portions;

ii. a first valve interposed between said upstream and downstream passage portions and having first and second positions in which it respectively connects said upstream passage portion to said downstream passage portion and separates said passage portions one from the other whilst connecting the downstream passage portion to an exhaust passage;

iii. a second valve interposed in said upstream portion of said main passage comprising a profiled member movable to provide a variable degree of restriction of an orifice, the position of said profiled member relative to said orifice being controlled by the resultant pressure on a diaphragm exposed on one side to the input pressure and on the other side to the braking pressure;

iv. means responsive to pressure in the downstream portion of said main passage to operate said second valve to provide a degree of restriction of flow in said main passage decreasing with increase of the pressure in said downstream portion of said main passage;

v. a pilot valve operated by the skid sensing means to control the action of air pressure from the driver's control valve on operating means for said first valve so that said first valve is held by said air pressure in its first position during normal braking and is urged by said air pressure to its second position when a skid is sensed; and vi. a restrictor by which the side of a diaphragm exposed to input pressure communicates with the inlet of the valve mechanism so that movement of the diaphragm with a reduction of braking pressure relative to input pressure is damped.

3. A valve mechanism according to claim 2, wherein the improvement further comprises said valve mechanism including a fourth valve provided in the exhaust passage from the first valve to control the rate of escape of air from the downstream portion of the main flow passage.

4. A valve mechanism according to claim 2, wherein the improvement further comprises the bypass being controlled by a second spool valve urged towards a maximum flow restricting position by a spring and in the opposite direction by the braking pressure.

5. A valve mechanism according to claim 2, wherein the improvement further comprises a second diaphragm provided to assist in controlling the position of the profiled member, the second diaphragm being exposed on one side to the braking pressure and on the other side to atmospheric pressure, the braking pressure acting in the same direction on both diaphragms.

6. A valve mechanism according to claim 2, wherein the improvement further comprises the fourth valve comprising an outlet chamber connected to the downstream portion of the main flow passage only when the first valve is in its second position, a control chamber constantly connected to the downstream portion of the main flow passage, a flexible diaphragm separating said chambers, and a valve closure member carried by said flexible diaphragm and cooperating with an outlet orifice in said outlet chamber.

7. A valve mechanism according to claim 6, wherein the improvement further comprises the control chamber being connected to the downstream portion of the main flow passage through a larger orifice controlled by a non-return valve allowing flow of air into the said chamber only, and also through a smaller, constantly open, orifice.

8. A valve mechanism according to claim 2, wherein the improvement further comprises the first valve comprising a diaphragm assembly consisting of two flexible diaphragms connected at their centres by a rod and each dividing one of two cavities into two chambers, the rod extending through a bore connecting the chambers on the sides of the diaphragms facing each other and valve seats being provided one at each end of the bore which are selectively engaged to close the corresponding ends of the bore by displacement of the diaphragm assembly in one direction or the other, the said bore being connected to the downstream portion of the main flow passage, the chambers connected by the bore being respectively connected to the driver's control valve through the second valve and to exhaust, the chamber on the outer side of the diaphragm and the chamber on the inner side thereof, which is connected to the driver's control valve being connected by an opening in that diaphragm and the chamber on the outer side of the other diaphragm being connected to the pilot valve.

* * * * *